ERROR CHECKING SYSTEM FOR A PARALLEL ADDER

Filed June 27, 1960 5 Sheets-Sheet 1

INVENTOR
STANLEY F. ANDERSON

BY Delbert C. Thomas

ATTORNEY

Feb. 19, 1963 S. F. ANDERSON 3,078,039

ERROR CHECKING SYSTEM FOR A PARALLEL ADDER

Filed June 27, 1960 5 Sheets-Sheet 3

Feb. 19, 1963 S. F. ANDERSON 3,078,039

ERROR CHECKING SYSTEM FOR A PARALLEL ADDER

Filed June 27, 1960 5 Sheets-Sheet 4

Feb. 19, 1963 S. F. ANDERSON 3,078,039

ERROR CHECKING SYSTEM FOR A PARALLEL ADDER

Filed June 27, 1960 5 Sheets-Sheet 5

3,078,039
Patented Feb. 19, 1963

3,078,039

ERROR CHECKING SYSTEM FOR A PARALLEL ADDER

Stanley F. Anderson, Poughkeepsie, N.Y., assignor to International Business Machines Corporation, New York, N.Y., a corporation of New York Filed June 27, 1960, Ser. No. 38,927
10 Claims. (Cl. 235—153)

This invention relates generally to error detection systems for use in the arithmetic devices of electronic computers and more particularly it relates to a system for detection of adder misoperations by the use of an independent check circuit for each denominational order of the adder of the computer.

The most comprehensive method of checking the accuracy of a parallel adder circuit in a computer is to duplicate the adder circuit, run the two adders in parallel with the same inputs and compare the two results for identity. Such operation gives a complete check but is very expensive as the adder circuit is more than doubled.

Another comprehensive method is to perform an addition using the given numbers, retain the sum, perform a second addition using the complements of the given numbers, and then compare the two sums which should be different in each denominational order. This method requires more than double the time for a single addition and slows down the over-all machine operation.

It has, therefore, been the practice to use an error checking system which compares the parity, i.e., the odd or even number of binary ones in a number, of the entry factors and the interdenominational carry-overs to the parity of the sum. Such a parity check device, although it cannot detect certain compensating errors and carry-over errors, is used because it requires a reasonable amount of equipment and does not slow down over-all operations.

It is an object of this invention to provide an error checking system which is comprehensive, does not slow down machine operations and uses substantially less equipment than the above comprehensive types of systems.

It is another object to provide an error checking system in which each denominational order of a parallel adder is separately checked to detect either single or multiple errors.

Still another object is the provision of a simple and inexpensive checking circuit to detect an erroneous operation of a complicated parallel adding circuit.

A further object of the invention is the provision in a parallel adding device of a check circuit for each denominational order, the inputs of each check circuit being assumed correct so far as each check circuit is concerned.

A still further object is to provide an error checking circuit in which all outputs of a parallel adder are checked as the outputs are generated.

It is also an object of the invention to develop a parallel adder error checking circuit which is equally useful in a computer having parity checking circuits or in a computer without such parity circuits.

The foregoing and other objects, features, and advantages of the invention will be apparent from the following more particular description of a preferred embodiment of the invention, as illustrated in the accompanying drawings.

Figure 2:
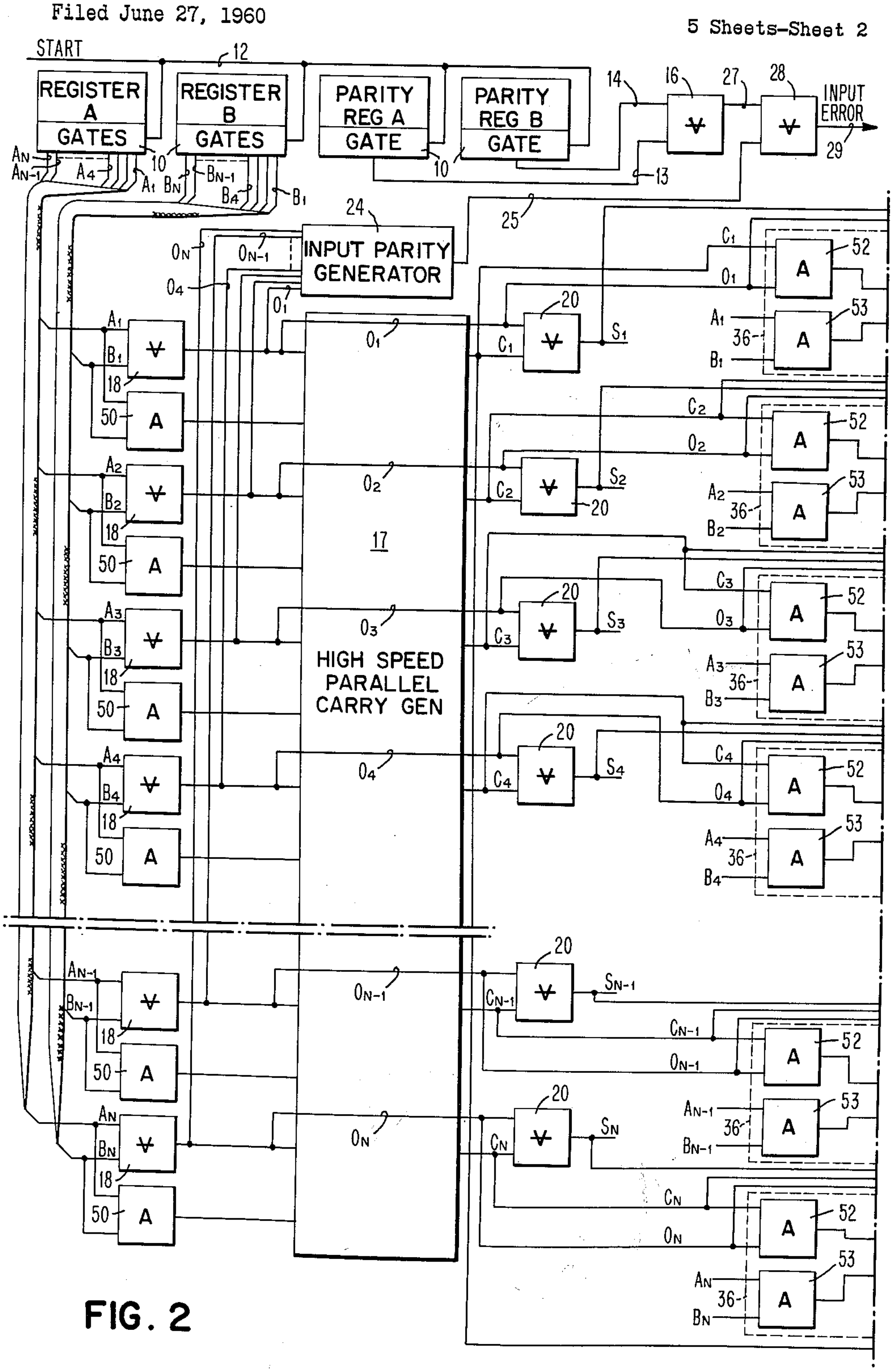
FIGURE 2 is a schematic showing a parallel adding circuit and a portion of the error checking circuits in a system having parity checking.
Figure 3:
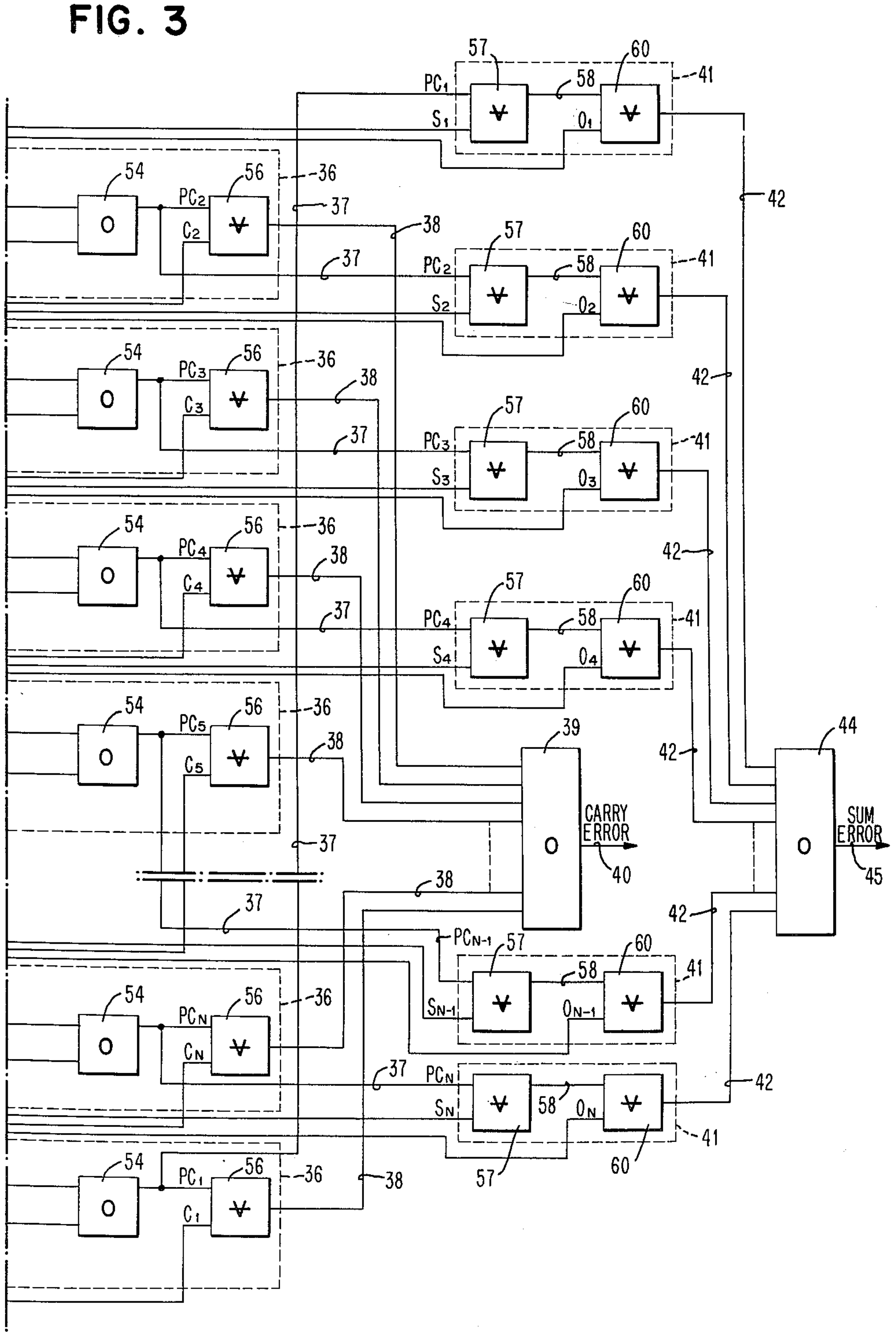

FIGURE 3 contains the remainder of the error checking circuits which may check the adder outputs of FIGURE 2.

Figure 4:
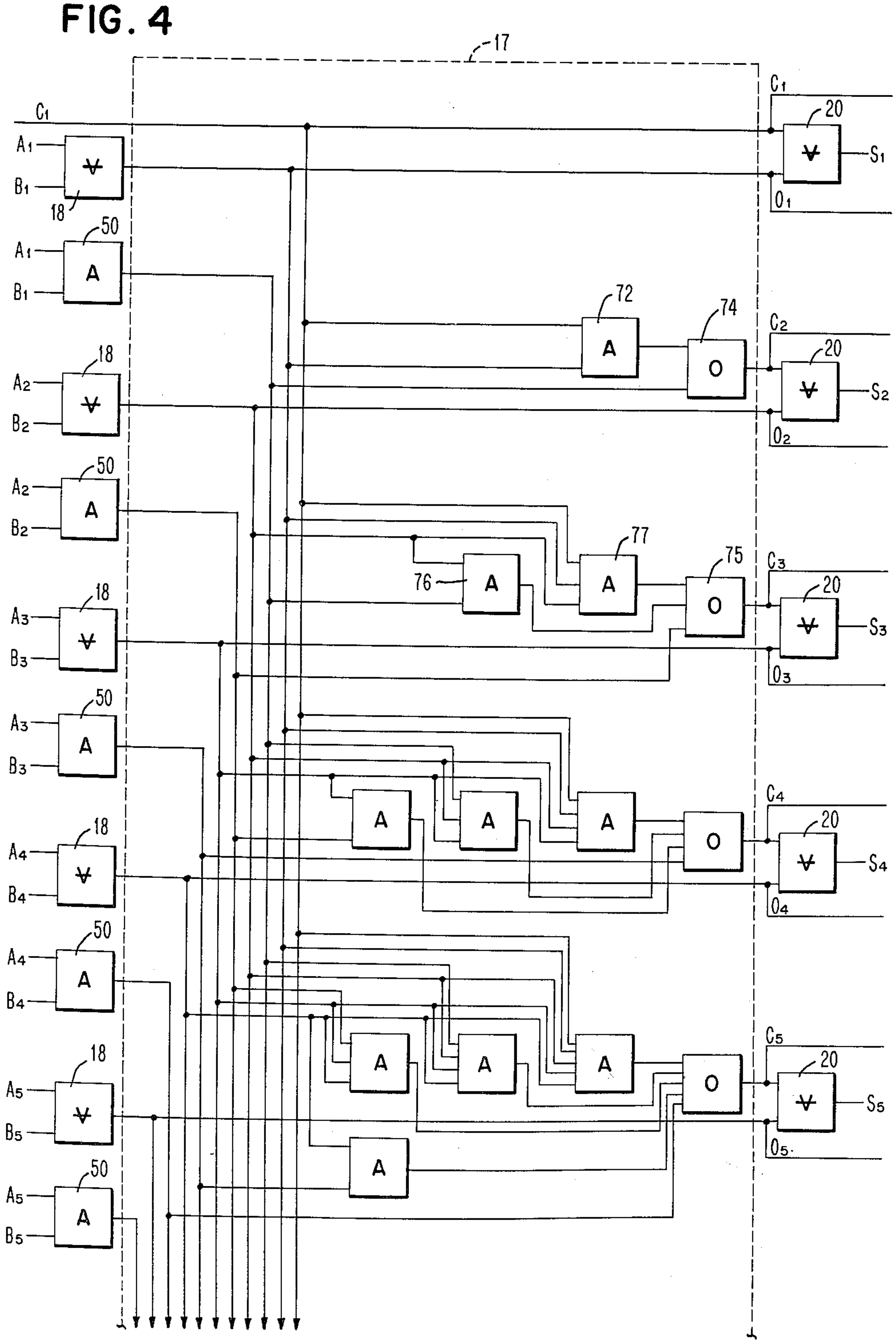

FIGURE 4 is a logical diagram of one type of high speed parallel carry circuitry.

Figure 5:
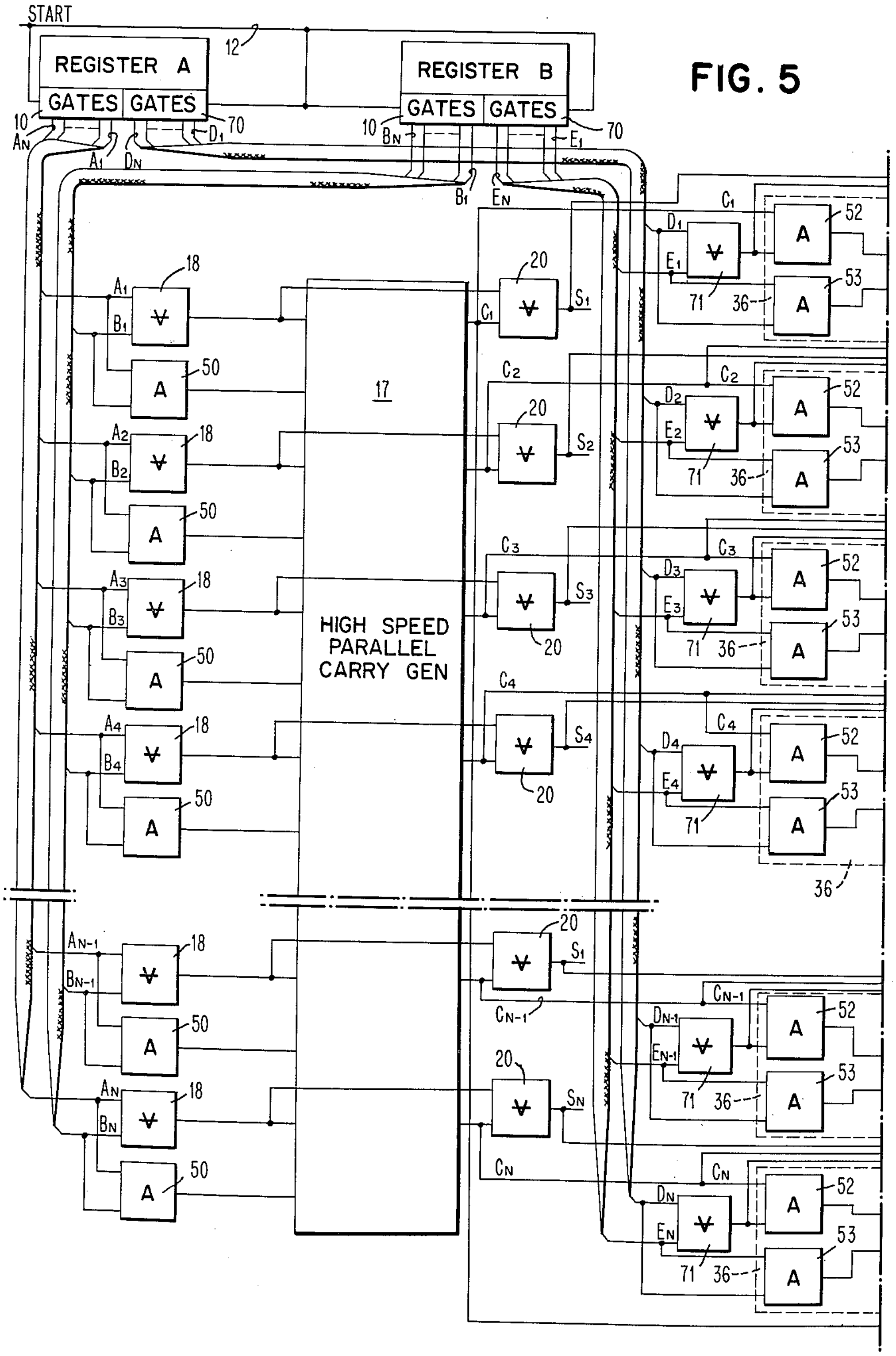

FIGURE 5 is a view similar to FIGURE 2 but for a system without parity checking and shows the adding circuits and check circuit inputs which may feed the circuits of FIGURE 3.

*General Description*

The parallel adder described here is a part of a large high speed computer and requires as inputs, signals representing, in parallel, the two numbers, expressed in binary form, to be added and a gating pulse to admit the signals into the adder. The output of the adder is a combination of simultaneous parallel signals representing the sum of the two input numbers and may be transmitted to and utilized in the other, not shown, sections of the computer as desired. The input signals into the adder are processed for parity and the generated parity is compared with the recorded parity of the two numbers to detect any single gating error, the likelihood of simultaneous gating errors being considered so low that checking for such multiple errors is not justified. The inputs are combined in a high speed parallel carry generator to develop interdenominational carry signals which are combined with the input signals to generate denominational output signals representing the binary bits of the sum of the numbers.

The output signals are sensed to determine the parity of the sum and this parity is compared with a parity generated from the parity of the two input numbers and the interdenominational carry signals to check the sum parity generator. A checking circuit is present for each denominational order to insure, for each order, that the generated sum and carry signals are the correct ones for the input and carry signals applied in that order. The error signals from the input parity check circuit, the sum parity generator and the denominational carry and sum checking circuits are combined to give an error signal which may be utilized to give any desired indication. The system is designed to be fail safe since any misfunction in either a checking circuit or in the adder circuits will cause an error indication to be given.

*Parallel Adder System*

Figure 1:
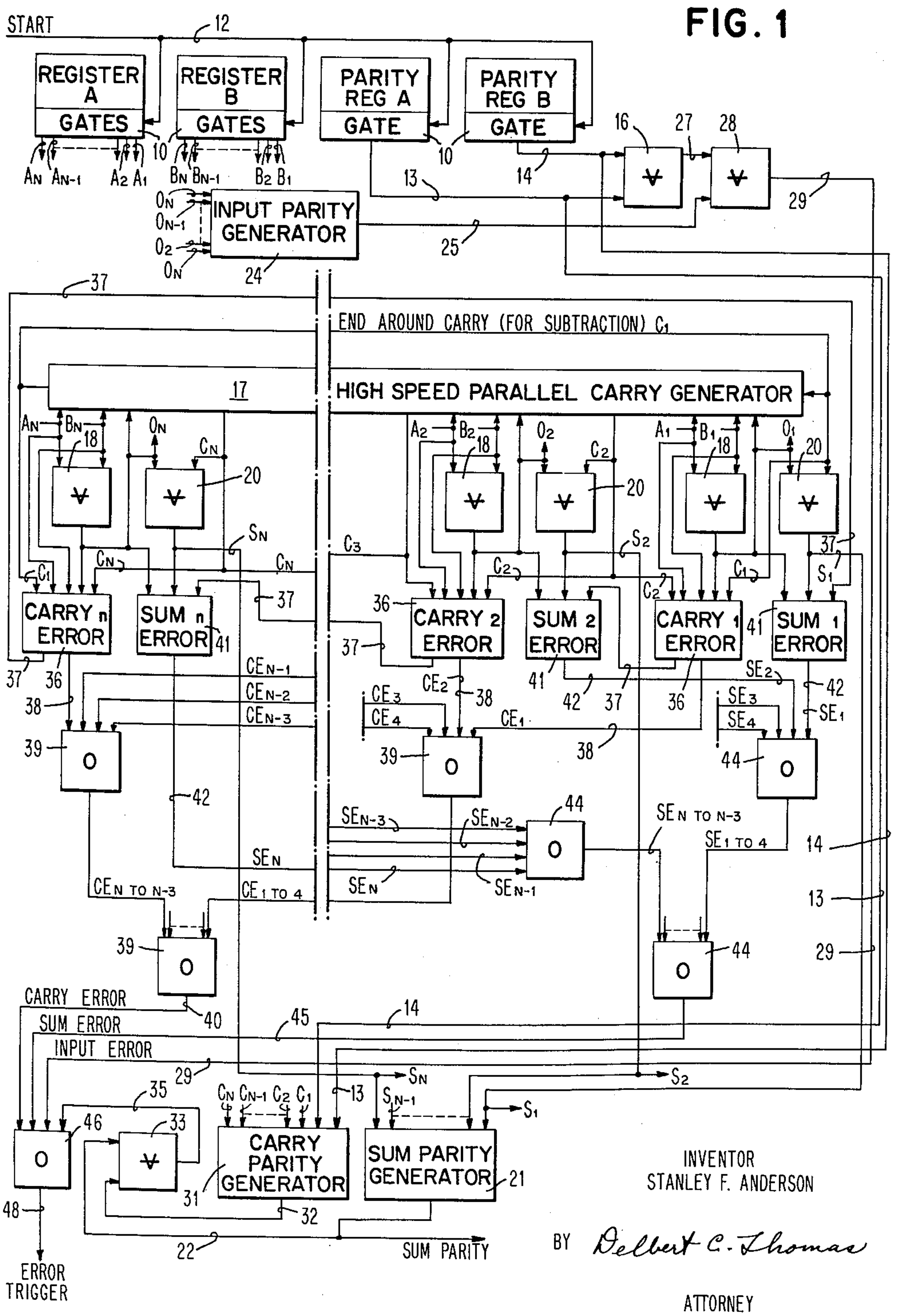
FIGURE 1 is a diagrammatic showing of a parallel adding system having a comprehensive error checking circuit for single and multiple errors.

Referring to FIGURE 1, the sources of the two sets of signals representing the two input numbers are shown as Register A and Register B. The parity signal associated with the number in Register A is present in Parity Register A and that for the number in Register B is present in Parity Register B. Each of the four registers has connected therewith a gate 10 for each denominational order signal. The gates 10 are conventional AND gates each having one input to receive a signal from the associated register order and another input connected to a line 12 common to all the gates and pulsed with a start signal when addition is to be performed. The output signals from the gates 10 for Register A appear on denominational output lines $A_1, A_2, \ldots A_N$; and the outputs from the gates 10 of Register B appear on similar denominational output lines $B_1, B_2 \ldots B_N$. Output lines 13 and 14 from gates 10 for Parity Registers A and B respectively are connected to the inputs of an EXCLUSIVE OR gate 16.

The EXCLUSIVE OR gates herein are represented by the symbol $\veebar$ and will pass a signal applied to either of the two input terminals but will not give an output when similar signals are simultaneously applied to both input terminals. The AND gates similar to gates 10 are represented on the drawings by the symbol A and will pass a signal only when all input terminals receive a signal. The other type of gate used herein is an OR gate, drawing symbol O, and will pass to its output terminal, a signal applied to any of its input terminals. It should be understood that the AND and the OR gates may have as many input terminals as are required. The preferred type of gates used in this invention are more fully described in assignee's copending application Serial No. 622,307, now Patent No. 2,964,652, filed November 15, 1956, and titled "Transistor Switching Circuits" although other gates having the same functions may also be used.

The denominational outputs $A_1, A_2, \ldots A_N$ and $B_1, B_2, \ldots B_N$, are applied in pairs $A_1B_1$; $A_2B_2$; etc., to a High Speed Parallel Carry Generator 17, more fully described hereafter, which selectively energizes lines $C_1, C_2, \ldots C_N$ in accordance with the interdenominational carry-overs required for the addition. Line $C_1$ is the end around carry from the highest denominational order into the lowest order and represents the "Fugitive One" required when subtraction is performed by adding the complement of the subtrahend. In each denominational order, the $A_K$ and $B_K$ signals, the subscript K representing any one of the denominations, are first applied to an $\veebar$ gate 18 to give a signal $O_K$ when the $A_K$ and $B_K$ signals are different and the output of gate 18 is applied as an input to another $\veebar$ gate 20 which also receives the $C_K$ signal for that denomination. The output of each gate 20 represents, for the denomination, the binary bit of the sum of the input numbers and is on a line $S_K$. The combination of signals on the lines $S_1, S_2, \ldots S_N$ represents the sum of the input numbers from Registers A and B and is available to the remainder of the computer system. To determine the parity of the sum, all of the lines $S_1, S_2, \ldots S_N$ are connected to the input terminals of a Sum Parity Generator 21 which will energize its output line 22 in accordance with the determined parity of the sum.

*Error Checks*

To determine if there has been an incorrect entry into an order of Registers A or B or a misoperation in any of the gates 10, 16 or 18, all outputs $O_1, O_2, \ldots O_N$ of $\veebar$ gates are applied as inputs to an Input Parity Generator 24, similar to Generator 21, to control generation of a parity bit on line 25. The output of $\veebar$ gate 16 on line 27 is also a parity bit representing the sum of the numbers and, since at this point there have been no carry-overs, should be the same as the parity bit on line 25. The signals on lines 25 and 27, which will be similar if gates 10, 16 and 18 have operated properly, are compared in $\veebar$ gate 28 to produce a signal on output line 29 if there has been a gating error in gates 10 and 18 or an error in the setting of Registers A or B. In the absence of an error signal on line 29, the signals $A_K$, $B_K$ and $O_K$ are, except for the improbable simultaneous failure of a pair of gates, to be considered correct.

To determine that there has been no error in the generation of the parity bit for the sum by Generator 21, a second Parity Generator 31 may be provided and receives as inputs the carry signals $C_1, C_2, \ldots C_N$ and the Register A and B parity bits from lines 25 and 27. The output of Generator 31 on line 32 should correspond to the parity bit output of Generator 21 on line 22. Lines 22 and 32 are, therefore, applied as inputs to an $\veebar$ gate 33 for comparison and to energize a parity bit error line 35 if an error is found in the generation of these parity bits. Parity Bit Generator 31 checks only the parity bit supplied for the sum and may be omitted if desired as an error in this parity bit will be detected the next time the number is utilized.

In each denominational order, there is provided a carry error detector 36 which receives as inputs the $C_K$, $O_K$, $A_K$ and $B_K$ signals for that denomination, utilizes these signals to determine if a carry should have been entered from Generator 17 into the next higher denominational order and energizes a predicted carry ($PC_{K+1}$) line 37 if such a carry should take place. The carry error circuit 36 also receives as an input the actual carry signal $C_{K+1}$ for the next higher denomination. The two carry signals $PC_{K+1}$ and $C_{K+1}$ are compared and if a difference is found, a carry error signal $CE_K$ is given on a line 38. All carry error signals $CE_1, CE_2, \ldots CE_N$, are combined in a group of OR gates 39 to energize a carry error line 40 if any error is detected in the operation of the carry circuits.

In a like manner, a sum error circuit 41 is provided for each denominational order. Each sum error circuit receives as its inputs the $O_K$ signal from $\veebar$ gate 18 for that order, the $PC_K$ signal from the next lower order (the lowest order receives the $PC_1$ signal from the highest order in the manner of an end around carry) and the sum signal $S_K$ from gate 20. The $S_K$ and $PC_K$ are subtracted and the remainder (neglecting carries) compared with the $O_K$ signal. A sum error signal $SE_K$ is given on a line 42 when an error is detected. All sum error lines 42 are connected as inputs to a group of OR gates 44 to give a sum error signal on an output line 45 when any one or more of the sums $S_1, S_2, \ldots S_N$ is incorrect.

It will be noted that the carry signal $C_K$ is a factor in generating the sum signal $S_K$ and an error in either the $C_K$ signal or a misoperation of $\veebar$ gate 20 will cause energization of output line 45 so that line 45 will be energized for either a sum or a carry error. The particular circuit at fault can be determined by reference to the output of the associated carry error circuit 39.

All error signal outputs on lines 29, 35, 40 and 45 are combined in an OR gate 46 to energize an error output line 48 on the occurrence of any error in the adder circuit. The error signal on line 48 may be utilized in any desired manner to control further operations of the computer of which this adder circuit is a part.

*Parallel Carry Adder*

A typical parallel carry adder which may have the error checking circuits of the invention applied thereto is shown in FIGURE 2. Here the A and B Registers, their parity bit storage registers, the gates 10, 16, 18 and 28 and the input Parity Generator 24 are the same as in FIGURE 1 and give the same input error check. In addition to the $\veebar$ gate 18 already described, each denominational order has an AND gate 50 fed by the two checked inputs $A_K$ and $B_K$ of that order. The outputs of the AND gates 50 feed the high speed parallel carry circuit 17 as will be more fully set out and together with the inputs from $\veebar$ gates 18 are used to energize the interdenominational carry signal lines $C_1, C_2, \ldots C_N$. The carry signals on these lines and the output signals of gates 18 are applied to the $\veebar$ gates 20 to generate the $S_1, S_2, \ldots S_N$ signals representing the sum of the numbers A and B.

The carry checking circuits 36, FIGURES 2 and 3, include two AND gates 52 and 53, an OR Gate 54, and a $\veebar$ gate 56 for each denominational order. Gate 52 receives as its inputs the $C_K$ signal which will be checked by the carry checking circuit of the next lower denomination, and the $O_K$ signal from its denominational gate 18 which has been checked by the Parity Generator 24 and gate 28. Gate 53 has the checked $A_K$ and $B_K$ signals as its inputs. The outputs of the gates 52 and 53 are combined in OR gate 54 to give a predicted carry signal $PC_{K+1}$ on output line 37. Otherwise stated, if a denomination has one bit input and a carry input from the next lower denominational order, or if it has two input bits from the Registers A and B, a carry signal to the next higher order should be generated in the carry circuits 17. The actual carry signal $C_{K+1}$ in the next higher order is compared with the $PC_{K+1}$ signal by $\veebar$ gate 56 and an error signal is given on line 38 if the two signals are different. As noted with reference to FIGURE 1, the error signals, if any, on lines 38 are applied as inputs to OR gate circuits 39 to energize line 40 to indicate that a carry error has occurred.

Thus, each interdenominational carry output is checked by a simple inexpensive circuit which receives only checked inputs including the next lower denominational order carry signal, generates the carry which should be present and compares the actual and expected carry signals.

To determine if any of the sum signals $S_1, S_2, \ldots S_N$ are in error, a sum error circuit 41 for each denomination is supplied with the $PC_K$ signal from line 37, the $S_K$ signal from gate 20 and the $O_K$ signal from gate 18. A first $\veebar$ gate 57 receives the $PC_K$ and $S_K$ signals and effectively causes a binary subtraction, binary addition and subtraction being the same if carry-overs are neglected, to put a signal on line 58. This signal on line 58 should correspond to the signal output of $\veebar$ gate 18 and these two signals are compared in $\veebar$ gate 60. If the expected and actual signals are not the same, the output line 42 is energized to pass a sum error signal through the OR gates 44 to the sum error line 45.

As noted above, this sum error signal will be generated if either the $C_K$ signal from carry circuits 17 is incorrect or there is a misoperation in $\veebar$ gate 20 and to this extent the carry error signal on line 40 is redundant. If a general indication of error is sufficient, the gates 56, lines 38, gates 39 and line 40 may be omitted without appreciable danger since the likelihood of simultaneous compensating errors in a carry signal and a gate 20 is negligible.

*Adding System Without Parity Checking*

The same comprehensive error check may be made in a high speed parallel adding circuit without parity provisions with only minor modifications. Referring now to FIGURE 5, the gates 10 for Registers A and B are still employed to feed input signals to denominational gates 18 and 50, which gates transmit their output signals to the same high speed carry generator 17 and to $\veebar$ gates 20 as are shown in FIGURE 2 to produce the same $S_1, S_2 \ldots S_N$ and $C_1, C_2, \ldots C_N$ signals. Since, however, there are no parity registers, the connections from the outputs of gates 18 to the inputs of Parity Generator 24, the Generator 24, and gates 16 and 28 of FIGURE 2 are omitted as well as the Parity Generators 21 and 31 and gate 33 of FIGURE 1. Instead, a second set of gates 70 are connected to the Registers A and B to pass the bits stored in the registers to a second set of output lines $D_1, D_2, \ldots D_N$, and $E_1, E_2, \ldots E_N$, corresponding to the A and B lines, when the start signal is applied to line 12. In each denominational order, the carry error circuit 36 receives the $C_K$ signal from the carry circuits 17 at one input of its AND gate 52. The other input of gate 52 receives the output signal from an $\veebar$ gate 71 having as inputs the $D_K$ and $E_K$ signals for that order from gates 70. Gate 71 may be a less expensive OR gate if a certain amount of redundancy can be tolerated in the system. Gate 53 also receives the $D_K$ and $E_K$ signals from gates 70. With these inputs and the previously described circuits of FIGURE 3, the carry checking circuit makes an independent determination of the carry which should be entered into the next order and compares it with the carry actually entered to determine if there has been an error.

The inputs to the sum error circuits 41 are the sum signals $S_K$ and the $PC_K$ signal from the carry error circuit 36. The second input to $\veebar$ gate 57 is, in this no parity embodiment, taken from the output of $\veebar$ gate 71; so that each circuit 41 independently computes the sum which should be present at the corresponding output adder circuits and signals an error if any variation is found. Thus, in this modification, there is a comprehensive check for misoperation of both the gating and the carry circuits, the high speed parallel carry circuits being checked denominationally by a simple inexpensive circuit.

*High Speed Carry Circuit*

The carry circuit shown in FIGURE 4 is one known type of high speed parallel carry generator 17 which may be used with the above adder. In this circuit, the gates 18, 20 and 50 are those shown in FIGURES 2 and 4. For the lowest denominational order, there is only one possibility of a carry-over being introduced in this order and that is by energization of the end around carry line $C_1$. It will be noted that this line passes through the carry generator as an input to $\veebar$ gate 20 and is also passed directly to the carry error circuit 36. For the second order, there are two possibilities for a carry into this order. These carries can appear when either $A_1$ or $B_1$, but not both, receives a signal and there is a carry signal on $C_1$, or when both $A_1$ and $B_1$ receive a signal. Symbolically stated $$C_2=(A_1 \veebar B_1)C_1+A_1B_1$$

or $$C_2=O_1C_1+A_1B_1$$

This $A_1B_1$ part is generated at the output of gate 50 of the first order and the $O_1$ and $C_1$ signals are applied as inputs to AND gate 72. The output signal of gate 72 and the $A_1B_1$ signal from gate 50 are supplied as inputs to an OR gate 74, the output of which is $C_2$, the carry signal into the second order.

There are three possible combinations of signals which can cause a carry into the third denominational order. These are two signal inputs into the second order, one signal input into the second order and two signal inputs into the first order, or one signal into each of the first and second orders and a carry into the first order. Symbolized this is $$C_3=(A_1 \veebar B_1)(A_2 \veebar B_2)C_1+(A_2 \veebar B_2)A_1B_1+A_2B_2$$

equivalent to $C_3=O_1O_2C_1+O_2A_1B_1+A_2B_2$. The $A_2B_2$ signal from gate 50 of the second order is one input of an OR gate 75. A second input of gate 75 is the output of AND gate 76 having as inputs the $O_2$ signal from gate 18 of the second order and the output of first order gate 50. The third input of gate 75 is the output of an AND gate 77 which has as inputs the $O_1$, the $O_2$ and $C_1$ signals. The output of gate 75 is the desired $C_3$ signal. For the carry into the fourth order, the symbol equation is $$C_4=O_3O_2O_1C_1+O_3O_2A_1B_1+O_3A_2B_2+A_3B_3$$

and for the fifth order the equation is $$C_5=O_4O_3O_2O_1C_1+O_4O_3O_2A_1B_1+O_4O_3A_2B_2+O_4A_3B_3+A_4B_4$$

It will thus be seen that the carry into any order will be the output of an OR gate having as inputs the output of the gate 50 of the next lower order, the output of a first AND gate fed by the output of gate 18 of the next lower order and the output of gate 50 of the second lower order, the output of a second AND gate fed by the outputs of gates 18 in the next two lower orders and the output of gate 50 of the third lower order, etc.

This type of parallel carry generator is satisfactory but it will be evident that in each denominational order, the number of AND and OR gates is equal to the denominational order number. In a large denomination adder, the carry circuits for higher orders become quite complicated and expensive. It is, therefore, the practice to group the carry circuits into minor groups of 4, 5 or 6 denominations as disclosed in FIGURE 5 and to use a second level carry network to pass carry signals between these minor groups. A carry generator of the grouped type which may be used with the adder disclosed herein is shown in assignee's application Serial No. 10,615, filed February 24, 1960, by Gerard T. Paul and Orest J. Bedrij and titled "Add One Adder." Another carry generator which might be used is disclosed in U.S. Patent No. 2,879,001, issued March 24, 1959, to Weinberger et al.

While the invention has been particularly shown and described with references to a preferred embodiment thereof, it will be understood by those skilled in the art that various changes in form and details may be made therein without departing from the spirit and scope of the invention.

What is claimed is:

1. In a parallel adder system of the class described having two sources of signals representing numbers to be added and adding circuits to generate signals representing the sum of said numbers, said adding circuits including a carry-over circuit to produce signals indicative of carries between the denominational orders of said sum, the combination of means for testing said sum signals and said carry signals to detect the presence of erroneous signals therein, said means comprising, for each denominational order, a circuit receiving signals representing the input digits and the interdenominational carry into that order and determining therefrom the carry and sum signals which should be generated in said denominational order, means to compare said determined signals with the corresponding ones generated by said adder, and an error signalling device activated when said comparing means detects a variance between said compared signals.

2. In an adding system of the class described having two sources of signals representing numbers to be added, each source simultaneously energizing a combination of output lines to indicate the binary bits of its number and an arithmetic unit responsive to the signals from said sources to produce signals representing the binary bits of the sum of said numbers and to produce other signals representing the interdenominational carries between the binary denominations of said sum, the combination of a checking circuit for each binary order of said adder, each checking circuit being responsive to the input signals and carry signals entering into the corresponding denominational order of said arithmetic unit to generate signals representing the sum output and the carry output signals to be expected from said arithmetic unit, means for comparing the output signals of said unit, denomination by denomination, with said expected signals, and error signalling means activated by said comparing means if said output signals and said expected signals differ.

3. In a parallel adding device having two sources of input signals, each source supplying simultaneous signals representing the denominational digits of a number to be added, and means responsive to said signals to generate signals representing the interdenominational digit transfers and the denominational digits of the sum of said numbers, the combination of an error determining means responsive to said input signals and to said transfer signals to generate a second set of transfer signals and sum signals, comparing devices to compare, in each denomination, the corresponding transfer and sum signals of said first and second sets, and a signalling output energized by said comparing devices when unlike signals are compared.

4. The combination with an adding device responsive to two sources of parallel signals representing respectively the denominational digits of two numbers to generate signals corresponding to the denominational digits of the sum of the numbers represented by said sources, said adding device including a parallel carry generator to supply signals corresponding to the required interdenominational digit transfers, of an error detecting circuit for each denominational order of said adder, each error detecting circuit being responsive to the signals representing the digits and the digit transfer to be entered into its denomination to provide a sum signal and a transfer out signal, comparing means in each denominational order to compare said two sum signals and to compare said transfer out signal with the corresponding digit transfer and a signal circuit energized when any comparing means detects a difference between said sum signals or said transfer signals.

5. A checking means for a high speed parallel adder device responsive to two sets of signals representing the denominational digits of two numbers to be added and generating simultaneous output signals corresponding to the denominational digits of the sum of said numbers and to the carries between denominations, said checking means comprising, for each denomination, a full adding circuit responsive to said input signals and to said carry signal entering into said denomination to generate a second sum signal and a signal for the carry into the next higher denomination, means to compare the sum signals from said adder with corresponding ones of said sum signals from said checking means, means to compare said carry signals from said adder with the corresponding signals from said checking means, and an error signal means energized when corresponding signals are different.

6. A device for checking the operation of an interdenominational carry generating circuit responsive to two sets of signals representing the digits of two numbers to be added to generate, in parallel, the required carry signals, said checking device comprising, for each denominational order, a circuit responsive to the input signals for that denomination and to the carry signal entered into such denominational order from said carry generating circuit, to provide a signal indicative of the carry which should be generated for entry into the next higher denominational order and a comparing means to compare corresponding carry signals and to energize a signal output when said signals are not alike.

7. A device for checking the operation of an interdenominational carry generating circuit responsive to two sets of simultaneous signals representing the denominational digits of two numbers to be added to generate, in parallel, signals representing the carry digits required between the denominations, said checking device comprising, for each denomination, a pair of AND gates, a first of said AND gates receiving signals corresponding to the digits of that denomination in said two numbers and the second gate receiving the carry signal entering into that denomination and another signal when only one of the two input digit signals for the denomination is present, means to combine the output signals of said gates to indicate when a carry should be entered into the next higher denomination and error detecting means to compare the carry signal actually entered into a denomination with the signal which should be entered and to activate a signal output when said compared carries are different.

8. An error detecting circuit for the interdenominational carry generator of a parallel adder, said carry generator receiving two sets of signals simultaneously, each signal set representing all of the denominational digits of a number, and generating, in parallel, signals representing the carry digits to be entered into each denominational order, said detecting circuit including, for each order, a group of gating devices responsive to said two input signals for said order and to the carry signal for that denomination to generate an expected carry signal when at least two of said signals are present, and means to campare said expected carry signal with the corresponding carry signal from said carry generator and to energize an output signal when a difference is detected.

9. A checking means for a high speed parallel adder device responsive to two sets of signals representing the denominational digits of two numbers to be added and generating simultaneous output signals corresponding to the denominational digits of the sum of said numbers and to the carries entered into each denomination, said checking device comprising, for each denomination, an AND gate having the two denominational input signals to the adder as its inputs, a second AND gate receiving a denominational output signal from the adder device and a signal indicating that one only of the two denominational inputs to the adder device received a unit representing signal, means to combine the outputs of said AND gates into a signal indicating the carry which should have been entered into the next higher denominational order, and a comparing circuit receiving signals representing the carry which should have been entered into that order, the sum generated by said adder device for that denomination, and the second signal applied to said second AND gate, said comparing circuit energizing an error indicating terminal if it receives an odd number of input signals.

10. A checking means for a high speed parallel adder device responsive to two sets of signals representing the denominational digits of two numbers to be added and generating simultaneous output signals representing the denominational digits of the sum of said numbers and the carries between denominations, said checking device comprising, for each denomination, a pair of two input AND gates receiving the signals representing the inputs to said adder device and an output thereof, means responsive to the outputs of said AND gates to generate a signal indicative of the carry which should have been entered into the next higher denominational order, a pair of exclusive OR gates, the output of one of said gates being connected to one of the inputs of the other of said gates and the other three inputs of said exclusive OR gates being connected to receive signals representing the denominational digit of the sum in said denominational order, the carry which should have been entered into said order, and a signal indicating that only one of the two digital inputs of that order received a signal whereby the output line of said other of said exclusive OR gates will be energized to indicate a sum or carry error if an odd number of signals are applied to said other three inputs of said exclusive OR gates.

No references cited.